(12) United States Patent
Krüger et al.

(10) Patent No.: US 12,448,689 B2
(45) Date of Patent: Oct. 21, 2025

(54) AQUEOUS POST TREATMENT COMPOSITION AND METHOD FOR CORROSION PROTECTION

(71) Applicant: Atotech Deutschland GmbH, Berlin (DE)

(72) Inventors: Mike Krüger, Berlin (DE); Ercan Karapinar, Berlin (DE); Martin Lenz, Berlin (DE); Anna Amell Tosas, Berlin (DE); Dennis Stritter, Berlin (DE)

(73) Assignee: Atotech Deutschland GmbH, Berlin (DE)

( * ) Notice: Subject to any disclaimer, the term of this patent is extended or adjusted under 35 U.S.C. 154(b) by 381 days.

(21) Appl. No.: 17/432,572

(22) PCT Filed: Feb. 27, 2020

(86) PCT No.: PCT/EP2020/055147
§ 371 (c)(1),
(2) Date: Aug. 20, 2021

(87) PCT Pub. No.: WO2020/174047
PCT Pub. Date: Sep. 3, 2020

(65) Prior Publication Data
US 2022/0119959 A1 Apr. 21, 2022

(30) Foreign Application Priority Data
Feb. 28, 2019 (EP) ...................... 19160144

(51) Int. Cl.
| C23C 28/00 | (2006.01) |
| C09K 15/02 | (2006.01) |
| C23C 22/02 | (2006.01) |
| C23C 22/82 | (2006.01) |
| C23C 22/83 | (2006.01) |
| C25D 3/22 | (2006.01) |
| C25D 5/48 | (2006.01) |
| C25D 7/00 | (2006.01) |

(52) U.S. Cl.
CPC .......... C23C 28/3225 (2013.01); C09K 15/02 (2013.01); C23C 22/02 (2013.01); C23C 22/82 (2013.01); C23C 22/83 (2013.01); C25D 3/22 (2013.01); C25D 5/48 (2013.01); C25D 7/003 (2013.01)

(58) Field of Classification Search
None
See application file for complete search history.

(56) References Cited

U.S. PATENT DOCUMENTS

| 5,230,750 A | 7/1993 | Shindou et al. |
| 5,294,266 A | 3/1994 | Hauffe et al. |
| 5,366,567 A | 11/1994 | Ogino et al. |
| 6,387,538 B1 | 5/2002 | Lee et al. |
| 6,527,841 B2 | 3/2003 | Matzdorf et al. |
| 2002/0053301 A1 | 5/2002 | Matzdorf et al. |
| 2016/0208390 A1 | 7/2016 | Shinozaki et al. |
| 2019/0145009 A1* | 5/2019 | Volk ........................ C23C 22/34 148/247 |

FOREIGN PATENT DOCUMENTS

| CN | 105803445 A | 7/2016 | |
| DE | 19638176 A1 | 4/1998 | |
| DE | 102016005656 A1 * | 11/2017 | ............. C23C 22/34 |
| JP | 01177378 A | 7/1989 | |
| JP | H01210088 A | 8/1989 | |
| JP | 0730457 B2 | 4/1995 | |
| JP | H07-30457 B2 | 4/1995 | |
| JP | 2002531696 A | 9/2002 | |
| JP | 2005508449 A | 3/2005 | |
| JP | 2005206872 A * | 8/2005 | ............. C23C 22/46 |
| WO | 0047799 | 8/2000 | |
| WO | 0207902 A2 | 1/2002 | |

OTHER PUBLICATIONS

Machine translation of Horie et al. JP-2005206872-A (Year: 2005).*
SpecialChem (https://adhesives.specialchem.com/product/a-nouryon-bindzil-cc401). (Year: 2024).*
PCT/EP2020/055147; International Search Report and Written Opinion of the International Searching Authority dated May 7, 2020.

* cited by examiner

*Primary Examiner* — Wojciech Haske
(74) *Attorney, Agent, or Firm* — Renner, Otto, Boisselle & Sklar, LLP

(57) ABSTRACT

The present invention is related to an aqueous post treatment composition for providing a post treatment layer on at least a part of a passivation layer, which is covering at least a part of a zinc layer being on at least a part of an iron containing substrate, characterized in that the aqueous post treatment composition comprises at least one chromium (III) ion source and at least one compound containing the chemical element silicon; wherein a molar ratio of silicon versus chromium is given in said composition, with the proviso that said molar ratio is ranging from 2600:1 to 1:1 for the zinc layer obtained by an electrolytic acid zinc deposition process; or that said molar ratio is ranging from 5200:1 to 1:1 for the zinc layer obtained by an electrolytic alkaline zinc deposition process.

11 Claims, No Drawings

AQUEOUS POST TREATMENT COMPOSITION AND METHOD FOR CORROSION PROTECTION

This application is a national phase of International Application No. PCT/EP2020/055147 filed 27 Feb. 2020, which claims priority to European Patent Application No. 19160144.2 filed 28 Feb. 2019, the entireties of which are hereby incorporated by reference.

FIELD OF THE INVENTION

The present invention relates to an aqueous post treatment composition for providing a post treatment layer on at least a part of a passivation layer, which is covering at least a part of a zinc layer being on at least a part of an iron containing substrate.

The present invention is further directed to a method for corrosion protection of an iron containing substrate comprising, in this order, the steps of
  i. providing an iron containing substrate,
  ii. electrolytic depositing a zinc layer on at least a part of said iron containing substrate by using a zinc deposition bath, and
  iii. depositing a passivation layer on at least a part of said zinc layer being on at least a part of said iron containing substrate by using a passivation deposition bath.

BACKGROUND OF THE INVENTION

There are several methods known in the prior art for protecting metallic material surfaces against corrosive environmental influences. The coating of a metallic work piece that is to be protected with a coating of another metal is a commonly used and well established method of the prior art. In the corrosive medium, the coating metal can be electrochemically more or less noble than the material base metal. If the coating metal is less noble, it functions, in the corrosive medium, as a sacrificial anode relative to the base metal (cathodic corrosion protection). Although the protective function resulting from the formation of corrosion products of the coating metal is desired, the corrosion products of the coating often result in undesirable decorative and not in frequently functional deterioration of the work piece.

In order to reduce or prevent, for as long as possible, the corrosion of the coating metal, so-called conversion or passivation layers are frequently used, especially on cathodically protecting less noble coating metals such as zinc or aluminum and their alloys.

These conversion or passivation layers are reaction products of the less noble coating metal with an aqueous post treatment composition, which reaction products are insoluble in aqueous media over a broad pH range. Examples for these so-called conversion or passivation layers are so-called phosphatizations and chromatizations.

In the case of phosphatizations, the layer which is to be protected is immersed into an acidic solution containing phosphate ions (see, for example, WO 00/47799). The acidic medium results in the partial dissolution of zinc from the coating. The zinc cations thus released, together with the phosphate ions of the treatment solution form a poorly soluble zinc phosphate layer on the surface. Since zinc phosphate layers themselves only provide comparatively poor protection against corrosion, but an excellent adherent surface for varnishes and paints applied thereto, their main area of application lies in their function as base layers for the application of varnishes and paints.

In the case of chromatizations, the surface to be treated is immersed into an acidic solution-containing chromium (VI) ions (see EP 0 553 164A1). In the case of, for example, a zinc surface, a part of the zinc dissolves. Under the reductive conditions which then prevail, chromium (VI) is reduced to chromium (III) which is precipitated in the surface film rendered more alkaline through the evolution of hydrogen inter alia as chromium (III) hydroxide or as poorly soluble chromium (III) complex. In parallel, poorly soluble zinc chromate (VI) is formed. As a result, there is formed a tightly closed conversion or passivation layer on the zinc surface which provides good protection against corrosive attack by electrolytes.

JPH0730457 B2 refers to a surface-treated steel sheet on which a chromate film is formed on a zinc or zinc alloy plated steel sheet. In order to improve corrosion resistance and anti-fingerprint property, a first chromate layer is formed followed by a second chromate layer containing chrome compounds and silica compounds.

JPH01177378 (A) refers to a steel sheet comprising a galvanized zinc or zinc alloy layer followed by two-chromate layers. The first layer comprises chrome, phosphorous, and optionally silicon, wherein the second layer comprises an organic resin as an essential component.

However, chromium (VI) compounds are acutely toxic and strongly carcinogenic so that a replacement for processes using these compounds has to be found.

As a replacement for chromatization processes using hexavalent chromium compounds, there have now been established a number of processes using various complexes of trivalent chromium compounds (see DE 196 38 176 A1).

Since the protection against corrosion that may be achieved thereby is usually inferior to that achieved with processes using hexavalent chromium, an additional organic sealing layer is often applied to work piece surfaces, usually by deposition from aqueous polymer dispersions. Especially, when using so-called black conversions or passivations, i.e. processes in which black layers are formed on zinc-containing surfaces by means of trivalent chromium compounds, the post treatment of this first conversion or passivation layer for improving the protection against corrosion is indispensable according to the prior art (see WO 02/07902 A2).

A disadvantage of this additional process step using polymer dispersions is the formation of drain lines with work pieces coated on a rack and/or the sticking together of pieces coated in bulk. Furthermore, there are problems regarding the size accuracy of threads and the like resulting from the thickness of such organic sealings. If such sealings provide strong protection against corrosion, the adhesion to the coated surface is normally also very strong. This means that adhesion to parts of the coating apparatus is also very good, which renders their cleaning difficult. Moreover, any items with coating faults which are to be recycled through the entire coating process must be de-coated with considerable effort, which usually requires an additional process step.

Objective of the Present Invention

In view of the prior art, it was thus an object of the present invention to provide an aqueous post treatment composition for providing a post treatment layer for improving the protection against corrosion of metallic, in particular, zinc-containing, surfaces provided with conversion or passivation layers, which shall not exhibit the aforementioned shortcomings of the known prior art compositions.

Furthermore, it was an object to provide a method for corrosion protection of an iron containing substrate, wherein a post treatment layer enhances the finally achieved corrosion protection of the substrate.

At the same time, the decorative and functional properties of the surfaces shall be maintained or improved.

Furthermore, the aforementioned problems resulting from the use of chromium (VD-containing compounds or from posttreatments with polymer dispersions shall be avoided.

In particular, it was an object of the present invention to provide an aqueous post treatment composition and a method for corrosion protection which shall be able to enhance the corrosion protection while at the same time an arising of white or red rust corrosion of the substrate is minimized or ideally completely avoided.

SUMMARY OF THE INVENTION

These objects and also further objects which are not stated explicitly but are immediately derivable or discernible from the connections discussed here-in by way of introduction are achieved by application of a method for corrosion protection of an iron containing substrate comprising applying an aqueous post treatment composition having all features of claim 1. Appropriate modifications to the inventive method are protected in dependent claims 2 to 11.

The present invention accordingly provides an aqueous post treatment composition for providing a post treatment layer on at least a part of a passivation layer, which is covering at least a part of a zinc layer being on at least a part of an iron containing substrate, characterized in that the aqueous post treatment composition comprises at least one chromium (III) ion source and at least one compound containing the chemical element silicon; wherein a molar ratio of silicon versus chromium in said composition is given, with the proviso that said molar ratio is ranging from 2600:1 to 1:1 for the zinc layer obtained by an electrolytic acid zinc deposition process; or that said molar ratio is ranging from 5200:1 to 1:1 for the zinc layer obtained by an electrolytic alkaline zinc deposition process.

It is thus possible in an unforeseeable manner to provide an aqueous post treatment composition for providing a post treatment layer for improving the protection against corrosion of metallic, in particular, zinc-containing, surfaces provided with conversion or passivation layers, which does not exhibit the aforementioned shortcomings of the known prior art compositions.

Furthermore, a method for corrosion protection of an iron containing substrate is provided, wherein a post treatment layer enhances the finally achieved corrosion protection of the substrate.

At the same time, the decorative and functional properties of the surfaces are maintained or improved.

Furthermore, the aforementioned problems resulting from the use of chromium (VD-containing compounds or from posttreatments with polymer dispersions are avoided.

In particular, an aqueous post treatment composition and a method for corrosion protection have been provided, which are able to enhance the corrosion protection while at the same time an arising of white or red rust corrosion of the substrate is minimized or ideally completely avoided.

BRIEF DESCRIPTION OF THE TABLES

Objects, features, and advantages of the present invention will also become apparent upon reading the following description in conjunction with the tables, in which:

Table 1 exhibits the prepared aqueous post treatment compositions, which have been used for the experiments in accordance with inventive and comparative embodiments of the present invention.

Table 2 exhibits a corrosion resistance results evaluation scheme, which has been used for evaluating the corrosion resistance results of the experiments in accordance with inventive and comparative embodiments of the present invention.

Table 3 exhibits the corrosion resistance results of a finally achieved substrate, wherein the zinc layer has been obtained by an electrolytic alkaline zinc deposition process, which uses an alkaline zinc deposition bath, in accordance with inventive and comparative embodiments of the present invention.

Table 4 exhibits the corrosion resistance results of a finally achieved substrate, wherein the zinc layer has been obtained by an electrolytic acid zinc deposition process, which uses an acid zinc deposition bath, in accordance with inventive and comparative embodiments of the present invention.

Table 5 exhibits the corrosion resistance results of a finally achieved substrate, wherein the zinc layer has been obtained by an electrolytic alkaline zinc deposition process, which uses an alkaline zinc deposition bath; and wherein a heat treatment of the substrate is executed as additional method step v, in accordance with inventive and comparative embodiments of the present invention.

Table 6 exhibits the corrosion resistance results of a finally achieved substrate, wherein the zinc layer has been obtained by an electrolytic acid zinc deposition process, which uses an acid zinc deposition bath; and wherein a heat treatment of the substrate is executed as additional method step v, in accordance with inventive and comparative embodiments of the present invention.

DETAILED DESCRIPTION OF THE INVENTION

Said aqueous post treatment composition according to the present invention is an aqueous bath, wherein the water content is more than 65% by volume, preferably more than 75% by volume, and more preferably more than 85% by volume of all solvents used.

Herein, said aqueous post treatment composition according to the present invention can be a solution or a suspension, preferably a suspension, in particular if said aqueous post treatment composition comprises at least a colloidal silicic acid, a colloidal silica and/or a colloidal silicate.

The at least one chromium (III) ion source can be added to the aqueous post treatment composition either in the form of inorganic chromium (III) salts such as basic chromium (III) sulfate, chromium (III) hydroxide, chromium (III) dihydrogen phosphate, chromium (III) chloride, chromium (III) nitrate, potassium chromium (III) sulfate or chromium (III) salts of organic acids such as chromium (III) methane sulfonate, chromium(III) citrate, or it can be formed by reduction of suitable chromium (VI) compounds in the presence of suitable reducing agents.

Suitable chromium (VI) compounds are, for example, chromium (VI) oxide, chromates such as potassium or sodium chromate, dichromates such as potassium or sodium dichromate.

Suitable reducing agents for the in situ formation of chromium (III) ions are, for example, sulfites such as sodium sulfite, sulfur dioxide, phosphites such as sodium hypophosphite, phosphorous acid, hydrogen peroxide, and methanol.

As mentioned already above, the present invention avoids the aforementioned problems resulting from the use of chromium (VD-containing compounds or from posttreatments with polymer dispersions. Thus, preferred is an aqueous post treatment composition not comprising (i.e. being free of) hexavalent chromium. This means that the aqueous post treatment composition does not comprise any chromium compounds and/or ions comprising chromium in an oxidation state (VI).

Preferred is an aqueous post treatment composition of the present invention, wherein the at least one chromium (III) ion source is the only chromium ion source, most preferably the only chromium source.

The aqueous post treatment composition has a pH between pH 2.5 and pH 7, preferably between pH 3 and pH 6, and more preferably between pH 3.5 and pH 5.

Optionally, the aqueous post treatment composition can additionally contain one or more complexing agents. Suitable complexing agents are, in particular, organic chelating ligands. Examples for suitable complexing agents are polycarboxylic acids, hydroxycarboxylic acids, hydroxypolycarboxylic acids, aminocarboxylic acids or hydroxyphosphonic acids. Examples for suitable carboxylic acids are citric acid, tartaric acid, malic acid, lactic acid, gluconic acid, glucuronic acid, ascorbic acid, isocitric acid, gallic acid, glycolic acid, 3-hydroxypropionic acid, 4-hydroxybutyric acid, salicylic acid, nicotinic acid, alanine, glycine, asparagine, aspartic acid, cysteine, glutamic acid, glutamine and lysine. A suitable hydroxyphosphonic acid is, for example, Dequest 2010™ (available from Solutia Inc.); a suitable aminophosphonic acid is, for example, Dequest 2000™ (available from Solutia Inc.).

In general, in order to increase the protection against corrosion, at least one metal or metalloid such as, for example, Sc, Y, Ti, Zr, Mo, W, Mn, Fe, Co, Ni, Zn, B, Al, Si, P is added to the aqueous post treatment composition. These elements can be added in the form of their salts or in the form of complex anions or the corresponding acids of these anions such as hexafluoroboric acid, hexafluorosilicic acid, hexafluorotitanic acid or hexafluorozirconic acid, tetrafluoroboric acid or hexafluorophosphoric acid or their salts.

Particularly preferably, zinc is added, which may be added in the form of zinc(II) salts such as, for example, zinc sulfate, zinc chloride, zinc phosphate, zinc oxide or zinc hydroxide.

Preferably, between 0.5 g/l and 25 g/l, particularly preferably between 1 g/l and 15 g/l of zinc ions are added to the aqueous post treatment composition.

The enumeration of zinc compounds only recites examples for compounds which are suitable according to the invention; however, the group of suitable zinc compounds is not limited to the substances specifically mentioned.

Additionally (optionally), in order to improve the film formation on the surface to be treated and for increasing the hydrophobic character of the surface, the aqueous post treatment composition can contain one or more water-soluble or water-dispersible polymers, selected from the group consisting of polyethylene glycols, polyvinyl pyrrolidones, polyvinyl alcohols, polyitaconic acids, polyacrylates and copolymers of the respective constituent monomers.

The concentration of the at least one polymer preferably lies in the range between 50 mg/l and 20 g/l. The addition of the aforementioned polymers to the aqueous post treatment composition results in significant improvements in the properties of the corrosion protection layers thus deposited.

Additionally (optionally), the aqueous post treatment composition can contain one or more surfactant. Especially in the case of complex parts or poorly wettable surfaces, this ensures a uniform composition of the coating layer and improved drainage behaviour.

Preferably, the aqueous post treatment composition comprises additionally one or more than one phosphate compound, most preferably oxo-compounds derived from phosphorous of the oxidation state+V as well as their esters with organic residues having up to 12 carbon atoms as well as the salts of the mono and diesters, preferably having 2 to 10 carbon atoms.

Suitable phosphate compounds are, in particular, alkyl esters of phosphoric acid with alkyl groups having up to 12 carbon atoms, preferably having 2 to 10 carbon atoms.

Examples of suitable phosphate compounds are orthophosphoric acid ($H_3PO_4$) and its salts, polyphosphoric acid and its salts, metaphosphoric acid and its salts, methyl phosphates (mono-, di- and triester), ethyl phosphates (mono-, di and triester), n-propyl phosphates (mono-, di- and triester), i-propyl phosphates (mono-, di- and triester), n-butyl phosphates (mono-, di- and triester), 2-butyl phosphates (mono-, di- and triester), tert.-butyl phosphates (mono-, di- and triester), the salts of the aforementioned mono- and diesters as well as di-phosphorus pentoxide and mixtures of these compounds.

The term "salts" comprises not only the salts of the fully deprotonated acids, but also salts of all possible degrees of deprotonation, for example, hydrogen phosphates and dihydrogen phosphates.

As used herein, the term "iron containing substrate", in the sense of the present invention refers to a substrate made of an iron-containing alloy such as cast iron (iron and ferrous alloys preferably comprising carbon and/or silicon as main alloying elements). Typical substrates are for example brake calipers and fasteners. The substrate is cleaned prior to any plating procedures with standard methods known in the art. For example, cleaners comprising a tenside, acidic cleaners and the like as well as application of ultrasonic radiation or electrical current during cleaning can be adapted to the substrate to be plated by the method according to the present invention.

As used herein, the term "passivation layer", in the sense of the present invention refers to a conversion or passivation layer, preferably a so-called black conversion or passivation layer rendering a surface black, being widely applied to zinc layers.

Conversion or passivation layers applied to a zinc layer are common to the field and comprise a basic chromium (III) complex and an oxidation agent in an acidic solution. These formulations form chromium (III) based conversion or passivation layer, preferably a black conversion or passivation layer comprising black pigment particles generated in situ. The chromium (III)-complex based layers increase corrosion protection already provided by the zinc layer. The additional corrosion protection provided by said layer is caused by a barrier function delaying the access of any corrosive solution to the zinc layer.

In one embodiment, said molar ratio is ranging from 2550:1 to 1:1, preferably from 270:1 to 1:1, more preferably from 200:1 to 1:1, for the zinc layer obtained by an electrolytic acid zinc deposition process.

In an alternative embodiment thereto, said molar ratio is ranging from 1700:1 to 1:1, preferably from 700:1 to 1:1, more preferably from 450:1 to 1:1, for the zinc layer obtained by an electrolytic acid zinc deposition process.

In one embodiment, said molar ratio is ranging from 5150:1 to 1:1, preferably from 2600:1 to 1:1, more preferably from 450:1 to 1:1, for the zinc layer obtained by an electrolytic alkaline zinc deposition process.

In an alternative embodiment thereto, said molar ratio is ranging from 1200:1 to 1:1, preferably from 450:1 to 1:1, more preferably from 200:1 to 1:1, for the zinc layer obtained by an electrolytic alkaline zinc deposition process.

In one embodiment, the concentration of the at least one chromium (III) ion source ranges from 0.005 g/l to 30 g/l, preferably from 0.008 g/l to 20 g/l, more preferably from 0.01 g/l to 10 g/l.

In one embodiment, the aqueous post treatment composition comprises at least a colloidal silicic acid, a colloidal silica and/or a colloidal silicate.

In a preferred embodiment thereof, the aqueous post treatment composition comprises at least an anionic colloidal silica, which preferably is pH stable and which has an acidic pH value.

Such a colloidal silicic acid can be provided in the form of sol or gel, in particular sol, which is commercially available, for example under the trade name "Ludox" or "Levasil". Colloidal silicic acids are silicic acid salts, preferably lithium salts, known as "lithium polysilicate". The $SiO_2/Li_2O$ molar ratio in these colloidal silicic acid lithium salts is in the range of 4.5 to 5.5, preferably in the range of 4.8 to 5.2.

The colloidal material can be used to adjust the pH to achieve the desired pH by mixing appropriately. The use of lithium polysilicate or other anionic polysilicates, sols or gels, for example, results in an alkaline pH in the range from 9 to 11, while using colloidal cationic $SiO_2$ produces an acidic pH. Mixing lithium polysilicate or other anionic polysilicates, sols or gels and colloidal cationic silica gel can produce any desired intermediate pH values.

In one embodiment, the aqueous post treatment composition comprises at least a silane.

Preferably, said silane has the following general formula:

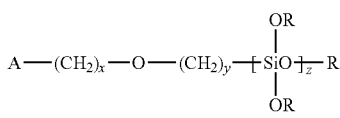

wherein A is the following residue

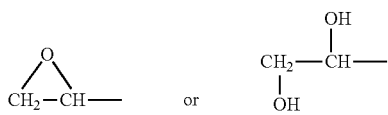

wherein x is a whole number from 1 to 6; y is 0 or a whole number from 1 to 6; R, which may be identical or different, is hydrogen or a $C_1$-$C_6$ alkyl group; and z is a whole number from 1 to 4.

More preferably, in the above formula, x and y are whole numbers independently from 1 to 4; most preferably x is 1 and y is 2 to 4, in particular 3. More preferably, R is a hydrogen atom or a methyl group. More preferably, A is the group $CH_2OH$—$CHOH$—.

Most preferably, the silane is a hydrolysis product of 3-glycidyloxypropyltrialkoxysilane, glycidyloxytrimethoxysilane or mixtures thereof.

Further, the object of the present invention is also solved by a method for corrosion protection of an iron containing substrate comprising, in this order, the steps of
 i. providing an iron containing substrate,
 ii. electrolytic depositing a zinc layer on at least a part of said iron containing substrate by using a zinc deposition bath,
 iii. depositing a passivation layer on at least a part of said zinc layer being on at least a part of said iron containing substrate by using a passivation deposition bath,
wherein the method is characterized by an additional method step iv, which is subsequently executed after method step iii, namely
 iv. depositing a post treatment layer on at least a part of said passivation layer of method step iii. by making use of an aqueous post treatment composition, which comprises at least one chromium (III) ion source and at least one compound containing the chemical element silicon; wherein a molar ratio of silicon versus chromium is given, with the proviso that said molar ratio is ranging from 2600:1 to 1:1 for using an acid zinc deposition bath in method step ii.; or that said molar ratio is ranging from 5200:1 to 1:1 for using an alkaline zinc deposition bath in method step ii.

The aforementioned regarding the aqueous post treatment composition of the present invention preferably applies likewise to the method of the present invention.

Preferred is a method of the present invention, wherein in step iii. the passivation layer is a black passivation layer. This preferably means that in step iii. the passivation deposition bath is a black passivation deposition bath.

In the method according to the invention, the deposition of the aqueous post treatment layer on at least a part of the passivation layer can be effected by methods which are known as such, in particular, by immersion.

The temperature of the aqueous post treatment composition lies preferably between 10° C. and 80° C., more preferably between 20° C. and 60° C., most preferably between 30° C. and 50° C.

The duration of said deposition method step iv lies preferably between 0.5 s and 180 s, more preferably between 20 s and 100 s, and most preferably between 40 s and 80 s.

Before carrying out the method according to the invention, the aqueous post treatment composition can be produced by diluting a corresponding more concentrated composition concentrate.

In one embodiment, the finally achieved substrates after executing the inventive method of the present invention are not rinsed, but preferably dried, such as for 10 minutes at 80° C., more preferably by applying a centrifuge for such a time and temperature, most preferably at 750 rounds per minute (rpm).

In one embodiment, in method step iv said molar ratio is ranging from 2550:1 to 1:1, preferably from 270:1 to 1:1, more preferably from 200:1 to 1:1, for using an acid zinc deposition bath in method step ii.

In one embodiment, in method step iv said molar ratio is ranging from 1200:1 to 1:1, preferably from 450:1 to 1:1, more preferably from 200:1 to 1:1, for using an alkaline zinc deposition bath in method step ii.

In one embodiment, after carrying out method step iv no subsequent heat treatment step is executed.

The present invention thereby differentiates explicitly between a common drying step as described above as optional method step and a so-called heat treatment step, wherein the finally achieved substrate is annealed for a certain longer period of time to influence the final substrate properties. A drying step, if foreseen, is, in contrast to a heat treatment step, executed to achieve a dry film layer on a substrate surface out of a liquid film being on said substrate surface.

In one alternative embodiment thereto, a further additional method step v. is comprised, which is subsequently executed after method step iv, namely v. executing a heat treatment of the substrate received after method step iv.

It has been surprisingly found that such an additional subsequently executed method step is advantageous for the corrosion protection of an iron containing substrate, wherein the surface of the iron containing substrate is covered by a zinc layer, a passivation layer, and a post treatment layer. The corrosion resistance achieved of the final substrate offers better salt spray test results than conventional methods, which does not make use of such an aqueous post treatment composition as claimed herein.

In a preferred embodiment thereof, in method step iv said molar ratio is ranging from 1700:1 to 1:1, preferably from 700:1 to 1:1, more preferably from 450:1 to 1:1, for using an acid zinc deposition bath in method step ii.

In another preferred embodiment thereof, in method step iv said molar ratio is ranging from 5150:1 to 1:1, preferably from 2600:1 to 1:1, more preferably from 450:1 to 1:1, for using an alkaline zinc deposition bath in method step ii.

In another embodiment of the present invention, the method can comprise a further subsequently arranged method step, wherein a top coat layer is deposited on at least a part of the post treatment layer by making use of a top coat composition comprising a dispersed wax and/or a lubricant.

The present invention thus addresses the problem of improving the corrosion protection of a substrate by providing a post treatment layer on at least a part of a passivation layer, which is covering at least a part of a zinc layer being on at least a part of such an iron containing substrate. Said inventive post treatment compositions have been found to be suitable for rack as well as for barrel applications.

The following non-limiting examples are provided to illustrate an embodiment of the present invention and to facilitate understanding of the invention, but are not intended to limit the scope of the invention, which is defined by the claims appended hereto.

All experiments have been executed with iron containing substrates, which have been M8*70 8.8 steel screws herein. Said screws comprise all a 10 micrometer zinc layer, which has been electrolytically deposited either by an alkaline method step (experiments listed in tables 3 and 5) making use of Protolux 3000 S (a commercially available alkaline zinc deposition bath of Atotech Deutschland GmbH); or by an acid method step (experiments listed in tables 4 and 6) making use of Zylite HT Plus (a commercially available acid zinc deposition bath of Atotech Deutschland GmbH).

Subsequently, a black passivation layer has been deposited by an electroless method step on the surface of the respective zinc layer. For a zinc layer, which had been deposited formerly by an alkaline deposition bath, Tridur Zn H11 (a commercially available black passivation deposition bath of Atotech Deutschland GmbH) has been used (experiments listed in tables 3 and 5). For a zinc layer, which had been deposited formerly by an acid deposition bath, Tridur Zn H2 (a commercially available black passivation deposition bath of Atotech Deutschland GmbH) has been used (experiments listed in tables 4 and 6).

Finally, a post treatment layer has been deposited by an electroless method step on the surface of the respective black passivation layer, wherein the respective aqueous post treatment composition as listed in table 1 has been used. The pH value of the aqueous post treatment composition has been 4, the temperature has been 40° C., and the immersion time 60 seconds in each experiment.

Said post treatment layer has been dried by a centrifuge for ten minutes at 80° C. with 750 rounds per minute (rpm) applied.

Tables 5 and 6 herein exhibit the experiments done, wherein an additional heat treatment step (annealing for six hours at 210° C.) had been added as additional method step.

Table 1 exhibits twenty different prepared aqueous post treatment compositions used for the experiments shown in tables 3 to 6. Herein, the respective concentration of silicon and chromium (calculated as chemical element) in grams per litre as well as the respective molar quantity of silicon and chromium is given for each prepared aqueous post treatment composition.

The respective resulting molar ratio of the chemical element of silicon versus chromium is given as highlighted value in bold for facilitating the comparison between the different experiments in tables 3 to 6.

TABLE 1

Aqueous post treatment compositions

| Composition Number | Si conc. [g/l] | Cr conc. [g/l] | Mol Si | Mol Cr | Molar ratio Si/Cr |
|---|---|---|---|---|---|
| 1 | 38.7 | 0.00 | 1.38 | 0.00 | / |
| 2 | 38.5 | 0.01 | 1.37 | 0.0002 | 5106:1 |
| 3 | 38.4 | 0.03 | 1.37 | 0.00058 | 2544:1 |
| 4 | 38.3 | 0.04 | 1.37 | 0.00077 | 1694:1 |
| 5 | 38.3 | 0.05 | 1.37 | 0.00096 | 1354:1 |
| 6 | 37.8 | 0.18 | 1.35 | 0.003 | 401:1 |
| 7 | 37.8 | 0.2 | 1.35 | 0.004 | 348:1 |
| 8 | 37.7 | 0.24 | 1.35 | 0.005 | 296:1 |
| 9 | 37.5 | 0.26 | 1.34 | 0.005 | 265:1 |
| 10 | 37.2 | 0.35 | 1.33 | 0.007 | 198:1 |
| 11 | 37.1 | 0.44 | 1.32 | 0.008 | 157:1 |
| 12 | 36.9 | 0.53 | 1.32 | 0.01 | 130:1 |
| 13 | 35.0 | 1.05 | 1.25 | 0.02 | 62:1 |
| 14 | 34.1 | 1.40 | 1.22 | 0.027 | 45:1 |
| 15 | 31.8 | 2.10 | 1.14 | 0.04 | 28:1 |
| 16 | 30.0 | 2.80 | 1.07 | 0.054 | 20:1 |
| 17 | 22.6 | 5.25 | 0.81 | 0.101 | 8:1 |
| 18 | 16.1 | 7.35 | 0.58 | 0.141 | 4:1 |
| 19 | 10.1 | 9.10 | 0.36 | 0.175 | 2:1 |
| 20 | 0.0 | 7.00 | 0.00 | 0.135 | 0 |

Table 2 exhibits a corrosion resistance results evaluation scheme, which has been used by the applicant of the present invention for evaluating the quality of the corrosion resistance of the finally achieved substrates. Said evaluation scheme is based on DIN EN ISO 10289 regarding the graduation of areas on the surface of the finally achieved substrates, which show corrosion defects. An own graduation for white rust and red rust corrosion has been applied by the applicant as criterion for the respective corrosion resistance based on the percentage of area of defects. The salt spray tests itselves has been executed according to DIN EN ISO 9227.

A white rust corrosion resistance of at least w4 (means less than 5% white corrosion) is commonly required at customer's site, such as in the automotive industry. Red rust is commonly completely forbidden in the respective specifications of the customer companies. Therefore, the inventive examples in tables 3 to 6 have been highlighted in bold for facilitating the analysis which molar ratio of silicon versus chromium is fulfilling said industrial requirements.

It is clearly to see that this selection invention is clearly differentiated from aqueous post treatment compositions, wherein either solely at least one chromium (III) ion source or at least one compound containing the chemical element silicon is provided. Furthermore, it is easily to see that even when at least one chromium (III) ion source and at least one compound containing the chemical element silicon is provided, the molar ratio found is selective for fulfilling the purpose of the invention.

TABLE 2

Corrosion resistance results evaluation scheme

| Area of defects [%] | White rust | Red rust |
|---|---|---|
| 0 | W10 | R10 |
| >0-0.1 | W9 | R9 |
| >0.1-0.25 | W8 | R8 |
| >0.25-0.5 | W7 | R7 |
| >0.5-1.0 | W6 | R6 |
| >1.0-2.5 | W5 | R5 |
| >2.5-5 | W4 | R4 |
| >5-10 | W3 | R3 |
| >10-25 | W2 | R2 |
| >25-50 | W1 | R1 |
| >50 | W0 | R0 |

TABLE 3

Corrosion resistance results of a finally achieved substrate, wherein the zinc layer has been obtained by an electrolytic alkaline zinc deposition process, which uses an alkaline zinc deposition bath.

| Experimental Number | Comp. Number | 72 h NSS | 168 h NSS |
|---|---|---|---|
| 21 | 1 | W2 | W0 |
| 22 | 2 | W1 | W0 |
| 23 | 3 | W1 | W0 |
| 24 | 4 | W2 | W0 |
| 25 | 5 | W3 | W1 |
| 26 | 6 | W9 | W1 |
| 27 | 7 | W8 | W0 |
| 28 | 8 | W10 | W2 |
| 29 | 9 | W8 | W2 |
| 30 | 10 | W10 | W8 |
| 31 | 11 | W8 | W5 |
| 32 | 12 | W10 | W6 |
| 33 | 13 | W9 | W6 |
| 34 | 14 | W9 | W6 |
| 35 | 15 | W9 | W6 |
| 36 | 16 | W9 | W5 |
| 37 | 17 | W9 | W6 |
| 38 | 18 | W9 | W5 |
| 39 | 19 | W9 | W4 |
| 40 | 20 | W3 | W0 |

TABLE 4

Corrosion resistance results of a finally achieved substrate, wherein the zinc layer has been obtained by an electrolytic acid zinc deposition process. which uses an acid zinc deposition bath.

| Experimental Number | Comp. Number | 72 h NSS | 168 h NSS | 240 h NSS |
|---|---|---|---|---|
| 41 | 1 | W0 | W0 | W0 |
| 42 | 2 | W1 | W0 | R7 |
| 43 | 3 | W10 | W0 | W0 |
| 44 | 4 | W8 | W0 | W0 |
| 45 | 5 | W9 | W0 | W0 |
| 46 | 6 | W10 | W1 | W1 |
| 47 | 7 | W10 | W2 | W2 |
| 48 | 8 | W10 | W2 | W2 |
| 49 | 9 | W10 | W6 | W2 |
| 50 | 10 | W10 | W6 | W4 |
| 51 | 11 | W10 | W9 | W4 |
| 52 | 12 | W10 | W7 | W5 |
| 53 | 13 | W10 | W10 | W9 |
| 54 | 14 | W10 | W10 | W10 |
| 55 | 15 | W10 | W10 | W10 |
| 56 | 16 | W10 | W10 | W10 |
| 57 | 17 | W10 | W10 | W10 |
| 58 | 18 | W10 | W10 | W9 |
| 59 | 19 | W10 | W10 | W10 |
| 60 | 20 | W3 | W3 | W2 |

TABLE 5

Corrosion resistance results of a finally achieved substrate, wherein the zinc layer has been obtained by an electrolytic alkaline zinc deposition process, which uses an alkaline zinc deposition bath; and wherein a heat treatment of the substrate is executed as additional method step v.

| Experimental Number | Comp. Number | 72 h NSS | 168 h NSS | 240 h NSS | 408 h NSS |
|---|---|---|---|---|---|
| 61 | 1 | W3 | W0 | W0 | R8 |
| 62 | 2 | W10 | W3 | W3 | W1 |
| 63 | 3 | W10 | W10 | W6 | W2 |
| 64 | 4 | W10 | W10 | W10 | W2 |
| 65 | 5 | W10 | W10 | W10 | W3 |
| 66 | 6 | W10 | W10 | W10 | W9 |
| 67 | 7 | W10 | W9 | W9 | W8 |
| 68 | 8 | W10 | W10 | W10 | W10 |
| 69 | 9 | W10 | W10 | W10 | W10 |
| 70 | 10 | W10 | W10 | W9 | W9 |
| 71 | 11 | W10 | W10 | W10 | W10 |
| 72 | 12 | W10 | W10 | W10 | W10 |
| 73 | 13 | W10 | W10 | W10 | W8 |
| 74 | 14 | W10 | W10 | W10 | W8 |
| 75 | 15 | W10 | W9 | W9 | W10 |
| 76 | 16 | W10 | W9 | W8 | W6 |
| 77 | 17 | W10 | W9 | W5 | W2 |
| 78 | 18 | W10 | W5 | W3 | W0 |
| 79 | 19 | W10 | W2 | W2 | W0 |
| 80 | 20 | W3 | W2 | W0 | R8 |

TABLE 6

Corrosion resistance results of a finally achieved substrate. wherein the zinc layer has been obtained by an electrolytic acid zinc deposition process, which uses an acid zinc deposition bath; and wherein a heat treatment of the substrate is executed as additional method step v.

| Experimental Number | Comp. Number | 72 h NSS | 168 h NSS | 240 h NSS | 408 h NSS |
|---|---|---|---|---|---|
| 81 | 1 | W0 | W0 | R0 | R0 |
| 82 | 2 | W0 | W0 | R1 | R0 |
| 83 | 3 | W1 | W0 | R7 | R0 |
| 84 | 4 | W9 | W4 | W1 | R3 |
| 85 | 5 | W10 | W5 | W1 | W1 |
| 86 | 6 | W10 | W10 | W10 | W10 |
| 87 | 7 | W10 | W10 | W10 | W10 |
| 88 | 8 | W10 | W10 | W10 | W10 |
| 89 | 9 | W10 | W9 | W9 | W8 |
| 90 | 10 | W10 | W10 | W8 | W7 |
| 91 | 11 | W10 | W10 | W10 | W9 |
| 92 | 12 | W10 | W9 | W8 | W7 |
| 93 | 13 | W10 | W10 | W10 | W10 |
| 94 | 14 | W10 | W10 | W10 | W9 |
| 95 | 15 | W10 | W10 | W10 | W8 |

TABLE 6-continued

Corrosion resistance results of a finally achieved substrate. wherein the zinc layer has been obtained by an electrolytic acid zinc deposition process, which uses an acid zinc deposition bath; and wherein a heat treatment of the substrate is executed as additional method step v.

| Experimental Number | Comp. Number | 72 h NSS | 168 h NSS | 240 h NSS | 408 h NSS |
|---|---|---|---|---|---|
| 96 | 16 | W10 | W9 | W9 | W9 |
| 97 | 17 | W10 | W9 | W9 | W9 |
| 98 | 18 | W10 | W9 | W9 | W5 |
| 99 | 19 | W10 | W9 | W9 | W5 |
| 100 | 20 | W3 | W3 | W2 | W0 |

While the principles of the invention have been explained in relation to certain particular embodiments, and are provided for purposes of illustration, it is to be understood that various modifications thereof will become apparent to those skilled in the art upon reading the specification. Therefore, it is to be understood that the invention disclosed herein is intended to cover such modifications as fall within the scope of the appended claims. The scope of the invention is limited only by the scope of the appended claims.

The invention claimed is:

1. Method for corrosion protection of an iron containing substrate comprising, in this order, the steps of
   i. providing an iron containing substrate,
   ii. electrolytic depositing a zinc layer on at least a part of said iron containing substrate by using a zinc deposition bath,
   iii. depositing a passivation layer on at least a part of said zinc layer being on at least a part of said iron containing substrate by using a passivation deposition bath,
wherein the method is characterized by an additional method step iv, which is subsequently executed after method step iii, namely
   iv. depositing a post treatment layer on at least a part of said passivation layer of method step iii. by making use of an aqueous post treatment composition, which comprises at least one chromium (III) ion source, does not comprise hexavalent chromium, and at least one compound containing the chemical element silicon; wherein a molar ratio of silicon versus chromium is given in said composition with the proviso, that said molar ratio is ranging from 2600:1 to 20:1 for using an acid zinc deposition bath in method step ii.; or that said molar ratio is ranging from 5200:1 to 20:1 for using an alkaline zinc deposition bath in method step ii, wherein the at least one compound containing the chemical element silicon is an anionic colloidal silica, or the at least one compound containing the chemical element silicon is a silane.

2. Method for corrosion protection according to claim 1 characterized in that in method step iv said molar ratio is ranging from 2550:1 to 20:1 for using the acid zinc deposition bath in method step ii.

3. Method for corrosion protection according to claim 1 characterized in that in method step iv said molar ratio is ranging from 1200:1 to 20:1 for using the alkaline zinc deposition bath in method step ii.

4. Method for corrosion protection according to claim 1 characterized in that after carrying out method step iv no subsequent heat treatment step is executed.

5. Method for corrosion protection according to claim 1 characterized by a further additional method step v, which is subsequently executed after method step iv, namely
   v. executing a heat treatment of the substrate received after method step iv.

6. Method for corrosion protection according to claim 5 characterized in that in method step iv said molar ratio is ranging from 1700:1 to 20:1 for using the acid zinc deposition bath in method step ii.

7. Method for corrosion protection according to claim 5 characterized in that in method step iv said molar ratio is ranging from 5150:1 to 20:1 for using the alkaline zinc deposition bath in method step ii.

8. Method for corrosion protection according to claim 1 characterized in that the passivation layer is a black passivation layer.

9. Method for corrosion protection according to claim 1 characterized in that in method step iv said molar ratio is ranging from 200:1 to 20:1 for using either the acid zinc deposition bath or the alkaline zinc deposition bath in method step ii.

10. Method for corrosion protection according to claim 1 wherein the at least one compound containing the chemical element silicon is an anionic colloidal silica.

11. Method for corrosion protection according to claim 1 wherein the at least one compound containing the chemical element silicon is a silane.

* * * * *